United States Patent [19]
Behr

[11] Patent Number: 5,496,979
[45] Date of Patent: Mar. 5, 1996

[54] ACCELEROMETER WITH OPTICAL SWITCH

[75] Inventor: Leonard W. Behr, White Lake, Mich.

[73] Assignee: Automotive Systems Laboratory, Inc., Farmington Hills, Mich.

[21] Appl. No.: 212,560

[22] Filed: Mar. 11, 1994

[51] Int. Cl.$^6$ ................................................. H01H 35/14
[52] U.S. Cl. .............................. 200/61.45 M; 200/61.53; 280/735; 307/10.1
[58] Field of Search ... 180/282; 200/61.45 R–61.45 M; 280/735; 307/10.1, 9.1; 340/436, 669

[56] References Cited

U.S. PATENT DOCUMENTS

| | | | |
|---|---|---|---|
| 3,269,685 | 8/1966 | Wallace | 248/346 |
| 4,477,732 | 10/1984 | Mausner | 307/9 |
| 4,649,271 | 3/1987 | Hök et al. | 250/227 |
| 4,827,091 | 5/1989 | Behr | 200/61.45 |
| 4,851,705 | 7/1989 | Musser et al. | 307/10.1 |
| 4,958,851 | 9/1990 | Behr et al. | 280/735 |
| 5,085,464 | 2/1992 | Behr et al. | 280/735 |
| 5,191,794 | 3/1993 | Abbink et al. | 73/514 |
| 5,196,660 | 3/1993 | Yoshimura et al. | 200/61.45 M |

*Primary Examiner*—Morris H. Nimmo
*Assistant Examiner*—Michael A. Friedhofer
*Attorney, Agent, or Firm*—Lyman R. Lyon

[57] ABSTRACT

An accelerometer (10) having a sensing mass (36) which is displaced in response to acceleration so as to alter the amount of light coupled between a pair of optical fibers (42, 44). An optical coupling is responsive to displacement of the sensing mass indicative of a vehicle crash situation. In operation, the sensing mass (36) interrupts the transmission of light through the output optical fiber (44) as the amount of sensing mass displacement reaches proximate a second position. The accelerometer further provides magnetic damping and testing/recalibration capabilities, and the ability to couple a plurality of accelerometers together in either a daisy chain configuration, or a star configuration.

2 Claims, 4 Drawing Sheets

ACCELEROMETER WITH OPTICAL SWITCH

BACKGROUND OF THE INVENTION

The instant invention relates to means for sensing the acceleration profile of an object, such as a motor vehicle.

The prior art teaches magnetically-biased acceleration sensors, or accelerometers, comprising a housing having an inertial or "sensing" sensing mass within an internal passage which is magnetically biased towards a first end of the passage by a magnet secured to the housing. When the housing is subjected to an accelerating force which exceeds the magnetic bias, the sensing mass begins to move from its rest position proximate to the passage's first end toward the passage's other end, with such movement preferably being retarded by a suitable damping means. Where the acceleration input to the housing is of sufficient magnitude and duration to displace the sensing mass to the other end of the passage, the sensing mass triggers a switch means in the sensor, as by bridging a pair of electrical contacts, to actuate an instrumentality connected with the switch means, such as a vehicle passenger safety restraint. In this manner, the sensor mechanically integrates the acceleration input to the housing.

In U.S. Pat. No. 4,827,091, I teach an accelerometer having a magnetic sensing mass which magnetically interacts with a magnetically-permeable element secured to the housing so as to be magnetically biased toward the passage's first end. When the housing is subjected to an acceleration sufficient to overcome the magnetic bias, the sensing mass is displaced towards the contacts at the other end of the passage. In accordance with another feature disclosed in my '091 patent, any sensing mass displacement is damped by virtue of the magnetic interaction of the sensing mass with one or more electrically-conductive nonmagnetic rings which encompass the passage, while the switch contacts at the other end of the passage move longitudinally in response to temperature in order to compensate for the effects of temperature on the magnetic damping effect.

Unfortunately, while my '091 accelerometer patent compensates for temperature effects on the magnetic damping through temperature-responsive longitudinal movement of the contacts, the accelerometer does not otherwise compensate for the effects of temperature on the magnetic flux generated by the sensing mass as it affects the sensor's threshold magnetic bias. Thus, as the magnetic flux generated by the sensing mass reversibly decreases with increasing temperature, the threshold magnetic bias is correspondingly decreased, with the attendant risk that the safety restraint controlled by the sensor will be triggered by a relatively low acceleration input.

In U.S. Pat. No. 4,922,065, I teach a magnetically-biased accelerometer similar to that of my '091 patent, wherein the first end of the passage is itself defined by a stop which moves longitudinally of the passage in response to changes in the operating temperature of the sensor, whereby the separational distance between the magnetic sensing mass and the washer and, hence, the nominal threshold magnetic biasing force on the sensing mass when positioned against the stop, are adjusted to compensate for the effects of temperature on the magnetic flux generated by the magnetic sensing mass.

U.S. Pat. No. 4,477,732 to Mausner teaches an accelerometer utilizing a spring-restrained inertial mass which is deflected relative to a fixed reference point when the mass is subjected to a particular acceleration force. Mausner discloses the placement of a photoconductor on the inertial sensing mass for receiving a beam of light from a light source. A set of three additional photoconductors are placed longitudinally adjacent the sensing mass. A first one of the three photoconductors aligns with the sensing mass photoconductor to generate a signal when the sensing mass is in a first rest position. The other two photodetectors are positioned to generate signals when the sensing mass exhibits maximum displacement in a negative sense (deceleration) or a positive sense (acceleration) respectively.

However, Mausner does not teach any testing or calibrating capability. Additionally, the accelerometer of Mausner requires several optical fibers and photoconductors per single accelerometer. Utilizing a number of these accelerometers in a crash discrimination system would be very costly due to the numerous dedicated optical components. Reliability of the system is also reduced with the increase in optical fibers required by the system.

It is further noted the accelerometer of Mausner only provides a "go/no go" detection mode. In other words, the accelerometer output signal only indicates if the sensing mass has not moved (no collision), or if the sensing mass has been maximally displaced by the detected acceleration (collision). Thus, Mausner cannot provide an accelerometer output proportional to any sensing mass movement less than maximum displacement.

Finally, it is noted that accelerometers are frequently deployed in pairs in the interest of increased reliability, e.g., a first sensor having a relatively low acceleration threshold serves to "arm" a second sensor having a relatively high acceleration threshold tailored to the particular application involved. However, in the event that the second, high-threshold sensor fails in the "closed" condition, i.e., incorrectly indicates an acceleration condition necessitating the deployment of the instrumentality controlled thereby, any acceleration exceeding the low acceleration threshold of the first, "safing" sensor will cause the deployment of that instrumentality. A graphic illustration of this condition is the deployment of an air bag upon encountering a pothole subsequent to the failure of the high-threshold sensor. It is, therefore, highly desirable to be able to spontaneously increase the biasing force on the sensing mass of the arming sensor and, hence, its acceleration threshold, upon an indication that the high-threshold sensor has "failed closed."

Thus, in accordance with another feature disclosed in my '091 patent, a sensor employing a magnetic sensing mass may further include an electrical coil encompassing the passage which, when energized by the delivery of a first direct current therethrough, effects the displacement of the sensing mass to the passage's other end and against the contacts to confirm the operability of the sensor. Alternatively, a second direct current may be delivered through the coils in the reverse direction, whereby the magnetic bias on the sensing mass is controllably increased.

SUMMARY OF THE INVENTION

An object of the instant invention is to provide an accelerometer characterized by reduced size and cost, improved reliability due to immunity to electromagnetic interference and the elimination of mechanical switch contacts.

Another object of the instant invention is to provide an accelerometer capable of being "daisy-chained" to permit the use of a single set of diagnostic electronics.

Yet another object of the instant invention is to provide a magnetically-damped, testable accelerometer capable of providing optical output in response to acceleration inputs to the accelerometer.

The instant invention provides an accelerometer comprising a housing having a passage extending therein with a stop means defining a first end of the passage. A magnetically-permeable element is secured to the housing proximate to the passage, and a magnetic sensing mass is moveable within the passage. The sensing mass is magnetically biased towards the magnetically-permeable element so as to remain in a first position against the stop means until the magnetic bias is overcome by acceleration of the housing. The sensing mass is displaced in response to such acceleration from the first position towards a second position in the passage. The magnetic bias is sufficient to return the sensing mass to the first position from any other position in the passage short of the second position. The accelerometer further includes an optical switch means responsive to the sensing mass displacement proximate the second position for generating an output signal.

The accelerometer of the instant invention also includes a magnetic damping means and a means for reversibly magnetizing the magnetically-permeable element to repel the sensing mass to the second position without regard to acceleration of the housing. The magnetic damping means comprises an electrically conductive nonmagnetic tube encompassing a longitudinal section of the passage, where the displacement of the sensing mass in the passage induces an electric current flowing in the tube, wherein the electric current in the tube generates a magnetic field opposing such displacement of the sensing mass. The means for reversibly magnetizing also acts to increase the magnetic bias of the sensing mass against the stop means, whereby the acceleration needed to displace the sensing mass to the second position is increased. The means for reversibly magnetizing the magnetically-permeable element comprises an electrical coil proximate to the second position, and a switchable means for delivering a direct current through the coil.

The instant invention further provides a vehicle crash discrimination system having a central monitoring and control means, and a plurality of accelerometers comprising a first and second set of accelerometers, each accelerometer being connected to the central monitoring and control means. The first set of accelerometers are responsive to a first vehicle acceleration threshold, and the second set of accelerometers are responsive to a second vehicle accelerometer threshold higher than the first threshold. Each accelerometer in the first and second set are structurally arranged as noted above. The central monitoring and control means triggers a passenger restraint device in response to the first set and the second set of accelerometers generating output signals indicative of respective sensing mass displacement to respective second positions. The central monitoring and control means can recalibrate the first set of accelerometers in response to detection of an accelerometer failure in the first set of accelerometers.

The instant invention also provides a vehicle crash discrimination system where the first set of accelerometers are connected in a "daisy chain" configuration in a first loop, and the second set of accelerometers are connected together in a "daisy chain" configuration in a second loop. The optical switch in each accelerometer comprises an input optical fiber for emitting a beam of light generated by the central monitoring and control means, an output optical fiber positioned to receive the emitted light, and a means for interposing the sensing mass between the input fiber and the output fiber, whereby the transmission of light from the input fiber to the output fiber is interrupted when the sensing mass is displaced towards the second position.

DETAILED DESCRIPTION OF THE PREFERRED EMBODIMENT(S)

Figure 1:
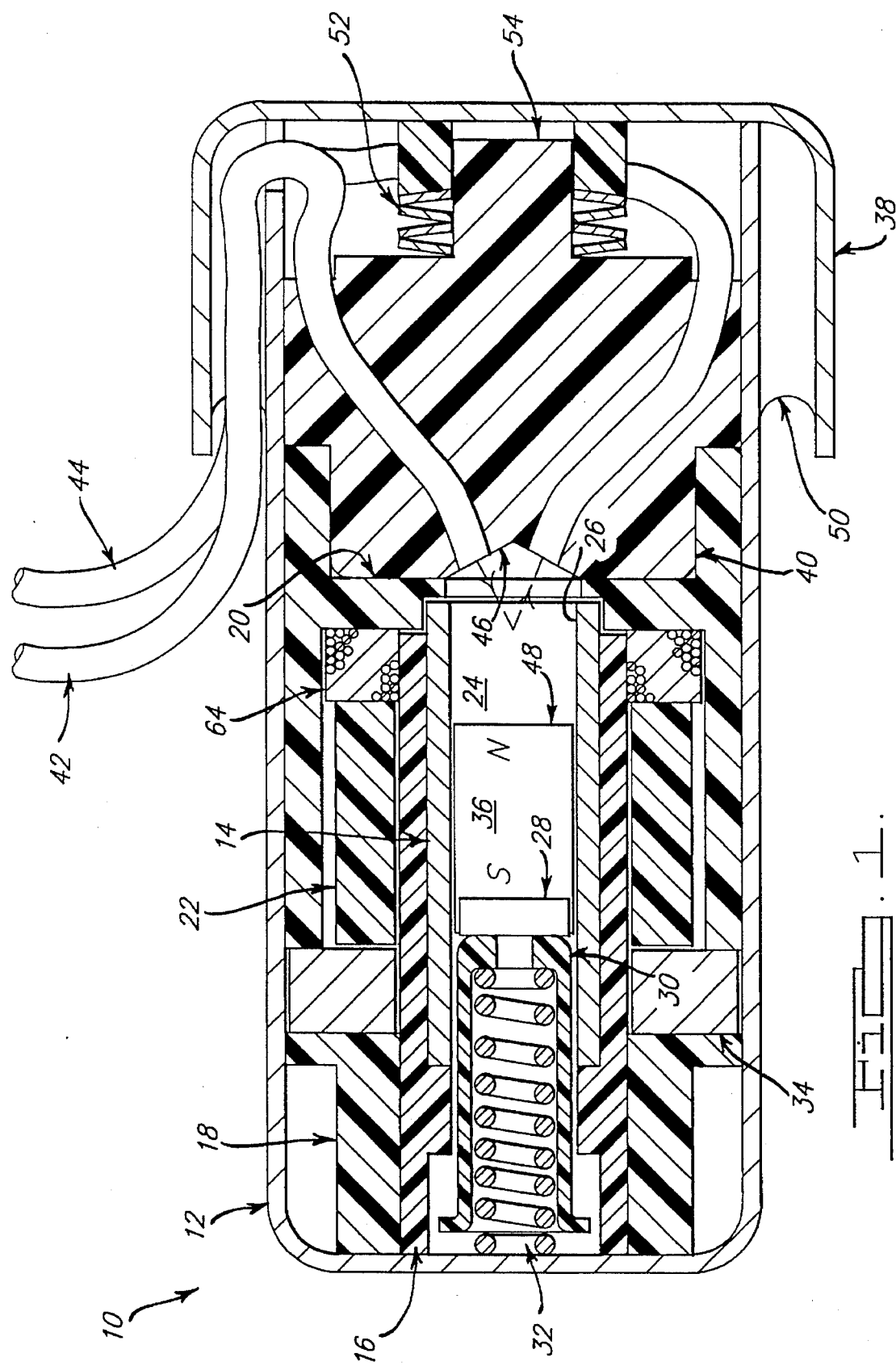
FIG. 1 is a longitudinal view in cross-section of a first exemplary embodiment of the instant accelerometer featuring a primarily analog optical output.

A vehicle accelerometer 10 constructed in accordance with a first exemplary embodiment of the instant invention is illustrated in FIG. 1. An iron or steel housing 12 houses a tube 14 and an encapsulating sleeve 16. The tube 14 is formed of an electrically-conductive nonmagnetic material such as copper while the sleeve 16 is preferably formed of an electrically-insulative material such as plastic, with the tube 14 being preferably secured therein as by press-fitting or through the use of an adhesive. The sleeve 16 is supported relative to the housing 12 on one end by a first flanged support member 18. Tube 14 is supported on the opposite end by a second flanged support member 20. An annular spacer sleeve 22 is further provided so as to maintain spatial relationships for the various internal elements relative to the accelerometer housing 12.

A right circular cylindrical passage 24 is thus defined within the housing 12 by the inner surface 26 of the copper tube 14. The first end of the passage 24 is defined by a stop element comprising a seal 28, a rigid sleeve 30, and a coil spring 32. The coil spring 32 can be a temperature-responsive element such as a coil spring described in U.S. Pat. No. 4,922,065 and incorporated by reference herein.

A magnetically-permeable element such as an iron or steel washer 34 is secured proximate to the first end of the passage 24 as by press-fitting the washer 34 about the plastic sleeve 16. It is noted that, in the preferred embodiment, the washer 34 is placed in proximity to, but electrically isolated from, the copper tube 14. More specifically, the washer 34 is positioned so that a magnetic sensing mass 36 situated within the passage 24 will magnetically interact therewith so as to maintain the sensing mass 36 in a first position in the passage 24 against the stop element 30 throughout the operating range of the sensor, in the absence of an acceleration input thereto. The precise configuration of the washer 34, i.e., the thickness, and the inner and outer diameters thereof, is adjusted so as to obtain the desired threshold magnetic bias when the sensing mass 36 is at the nominal "rest" position in the passage 24.

Referring again to FIG. 1, the second end of the passage 24 is defined by a plug 40. In the first exemplary embodiment, the instant invention utilizes an "analog" fiber optic detection system in conjunction with sensing mass 36 to generate an output signal proportionally indicative of the sensing mass 36 movement relative to the fixed accelerometer structure. An external input optical fiber 42 and an external output optical fiber 44 are inserted into respective channels in the plug 40 for angular inward positioning relative with the second end of the passage 24. A conical cavity 46, dimensioned to align with the second end of passage 24, provides the predetermined angled disposition necessary for optical fibers 42 and 44. Sensing mass 36 is provided with a reflective type surface 48 as will be more fully described hereinbelow.

The housing 12 is preferably sealed upon attachment of the cap 38 thereto during final assembly as by the use of a suitable potting material 50, in order to prevent the infiltration of moisture and other contaminants which might adversely affect the operation of the instant accelerometer 10. However, it is significant to note that the integrity of the seal thus formed between the cap 38 and the housing 12 is not critical to the continued operation of the accelerometer 10.

A spring element, such as Belleville spring 52, is preferably used with the mounting of cap 38 to the housing 12. The spring element 52 allows for a light tension force to be applied to a mounting protrusion 54 on annular support element 40, which in turn provides a compression fit (via the left outer surface of support element 40) for the remaining internal accelerometer elements. The spring element 52 further allows support element 40 to absorb any potential shock forces which might occur due to impact of the sensing mass 36 with the support element 40. A Belleville spring (washer) is advantageously used because of the inherent quality of providing a constant spring force over a significantly wide compression range.

In operation, the sensing mass 36 is magnetically biased towards the washer 34 so as to remain in the first position within the passage 24 against the stop element until the threshold magnetic bias therebetween is exceeded by an acceleration input to the housing 12, whereupon the sensing mass 36 is displaced in response to such acceleration towards a second position within the passage 24 proximate to the second end. Specifically, the second position of the sensing mass 36 within the passage 24 is the position therein which results in the maximum reflection of a light beam to the receiving optical fiber. The outer edge surface of conical cavity 46 forms a second stop for preventing the escape of the sensing mass 36 from the tube 14 when the accelerometer is subjected to an extreme acceleration, or during a test of the sensor in the manner described hereinbelow.

Figure 2:
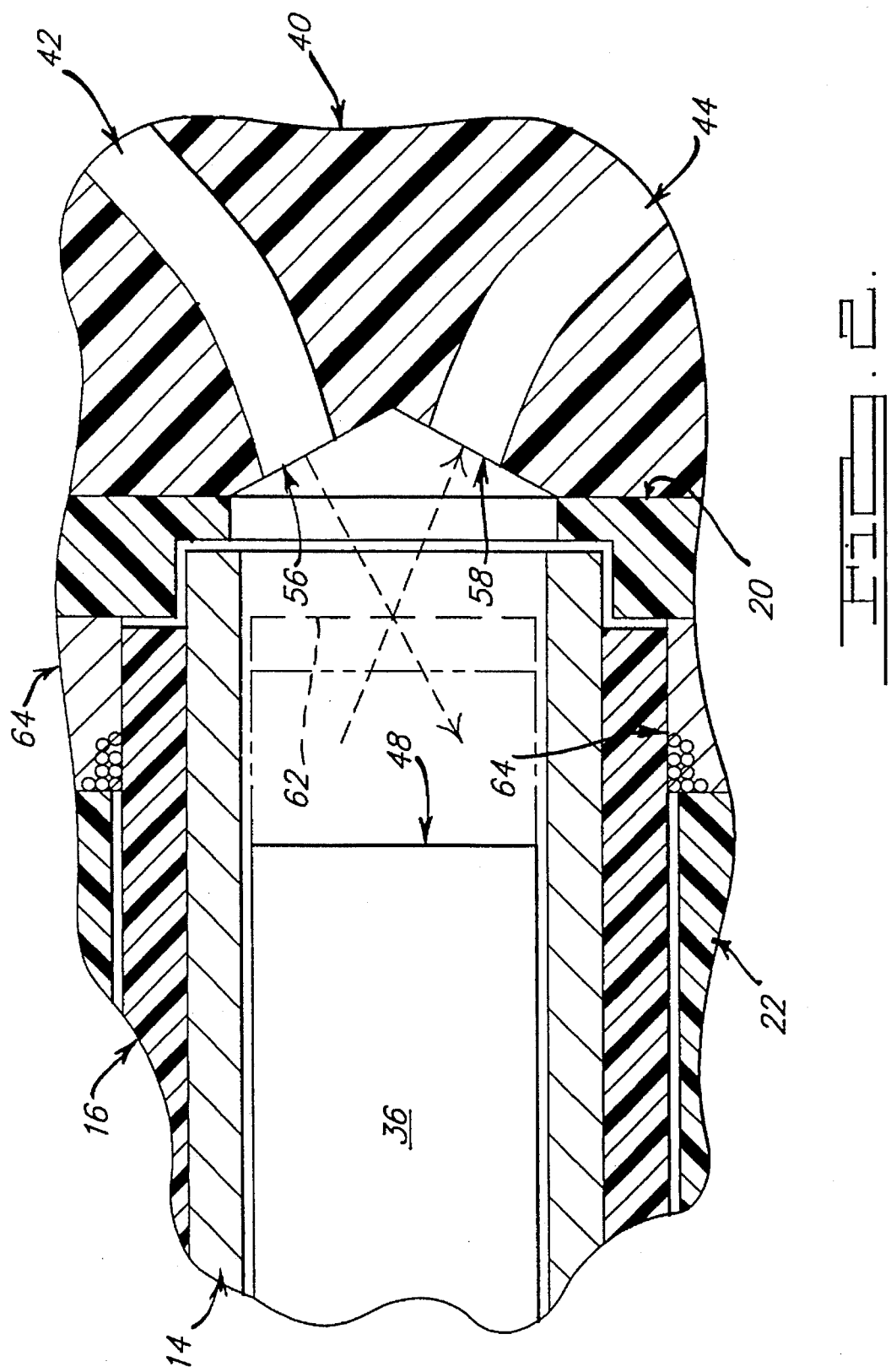
FIG. 2 is an enlarged longitudinal view in cross-section illustrating the operation of the primarily analog optical switch.

The operation of the "analog" fiber optic detection system is more fully illustrated in FIG. 2. A remote light source (not shown), such as an LED, generates a beam of light into input optical fiber 42. A GRIN lens 56, attached to the end of the input fiber 42, collimates/focuses the beam of light at a predetermined angle and intensity into passage 24. However, it is to be noted that while the present invention is described as utilizing a pair of GRIN lenses, the teachings of the present invention do not require the use of GRIN lenses to provide a functional fiber optic detection system. As the sensing mass 36 begins to move to an intermediate position in passage 24, the reflective surface 48 will start to reflect (i.e. modulate) the beam of light with a greater magnitude of intensity onto GRIN lens 58 attached to the end of output fiber 44. Remote photodetectors (not shown) connected to output fiber 44 will receive the beam of light reflected by surface 48. The intensity level of the reflective beam of light can be measured by control circuitry (not shown) to indicate the amount of sensor mass 36 movement. Such control circuitry can be implemented by a microprocessor. The fibers 42 and 44 are angled so that when the sensing mass reaches the second position 62, the surface 48 will reflect the maximum possible intensity of light beam onto output fiber 44. With this arrangement, an "analog" output can be generated by the accelerometer 10 proportional to all sensor mass 36 movement. This provides the advantage of permitting earlier possible deployment of an air bag to anticipate a crash situation.

The magnetic bias on the sensing mass 36, i.e., the magnetic attraction between the sensing mass 36 and the washer 34, is sufficient to return the sensing mass 36 to its first position against the stop element from any other position within the passage 24 including the second position upon a reduction in the accelerating input to the housing 12. The inner surface 26 of the tube 14, or the radially-outermost portion of the sensing mass 36, is preferably teflon-coated to reduce the sliding friction therebetween.

The tube 14 of the accelerometer 10 provides magnetic damping for the sensing mass 36 which varies in proportion to the rate of such displacement of the sensing mass 36. More specifically, the tube 14 provides a magnetic field which opposes such displacement of the sensing mass 36 through the inducement therein of an electric current by the magnetic field of the sensing mass 36. It is noted that the damping tube 14 may encompass another element (not shown) defining the passage 36 or may itself define the passage 24, as shown in FIG. 1.

The effects of variations in the magnetic damping field which result from changes in the resistance of the tube 14 and the magnetic flux density generated by the sensing mass 36 due to changes in temperature may be reduced by fabricating the tube 14 from a copper alloy having a negative temperature coefficient. The accelerometer 10 thus is able to continue to accurately integrate the acceleration input to the housing 12 notwithstanding changes in the operating temperature.

The electromagnetic damping generated by the interaction between the tube 14 and the sensing mass 36 obviates the need for extreme manufacturing tolerances with respect to the gap between the sensing mass 36 and the inner surface 26 of the tube 14. For example, with the instant accelerometer, the gap may be on the order of ten to twenty thousandths of an inch, in contrast with a gap of perhaps only twenty microns which is typically required in prior art gas-damped sensors. Moreover, since the magnetic damping employed by the instant accelerometer 10 is unaffected by a breach of the seal formed between the housing 12 and the cap 38, there is no inherent failure mode as in such prior art gas-damped sensors. This, coupled with the absence of moving and/or contacting parts inherent to the optical switch means employed with the instant accelerometer substantially increases accelerometer reliability.

The direction of current flow through the coil 64 may be reversed to increase the magnetic force biasing the sensing mass against the stop element, whereby the accelerometer may be recalibrated to indicate a higher acceleration threshold. For example, where the present accelerometer 10 is employed as a low-threshold "arming" or safing sensor for a second high-threshold discriminating sensor, the threshold of the former may be increased in the event of a failure of the latter, whereby system reliability is substantially improved.

An electrically-conductive wire is wound around the outer surface of the plastic sleeve 16 to form a coil 64. Thus, the coil 64 encompasses the tube 14 proximate to the second position of the sensing mass 36 therein, and the housing 12 provides an additional flux path for the magnetic flux generated upon the energizing of the coil 64. While the coil 64 is shown encompassing the plastic sleeve 16 proximate the second position of the sensing mass 36, the coil 64 could be effectively positioned around the sleeve 16 proximate to the first position, or multiple coils could be positioned respectively around the sleeve 16 proximate to the first and second positions. A pair of lead wires (not shown) can extend through the housing 12 to facilitate the connection of the coil 64 with a battery via a switch.

The operability of the accelerometer 10 is tested by delivering a unidirectional current pulse through the coil 64. The resulting magnetic field causes the sensing mass 36 to move to the second position within the passage 24. Upon reaching the second position, the reflective surface 48 of the sensing mass 36 will provide maximum reflection of the light beam on to receiving optical fiber 44, whereby full accelerometer function is confirmed. Moreover, such controlled direction of a current through the coil 64 permits calibration of the analog output signal generated by the accelerometer's optical switch.

It is noted that the sensor housing 12 and the cap 38 are preferably formed of iron or steel to isolate the sensing mass 36 from external electromagnetic fields. And, while the housing 12 may magnetically interact with the sensing mass 36 so as to force it into engagement with the passage surface 26, such engagement may nonetheless be preferable to the unpredictable effects on sensor response due to such external magnetic fields and materials. Moreover, the housing 12 may be asymmetrically positioned about the tube 14 so that the magnetic interaction between the housing 10 and the sensing mass 36 tends to counter the force of gravity on the latter, whereby the engagement between the sensing mass 36 and inner surface 26 of the tube 14 due to gravity is also minimized.

Figure 3:
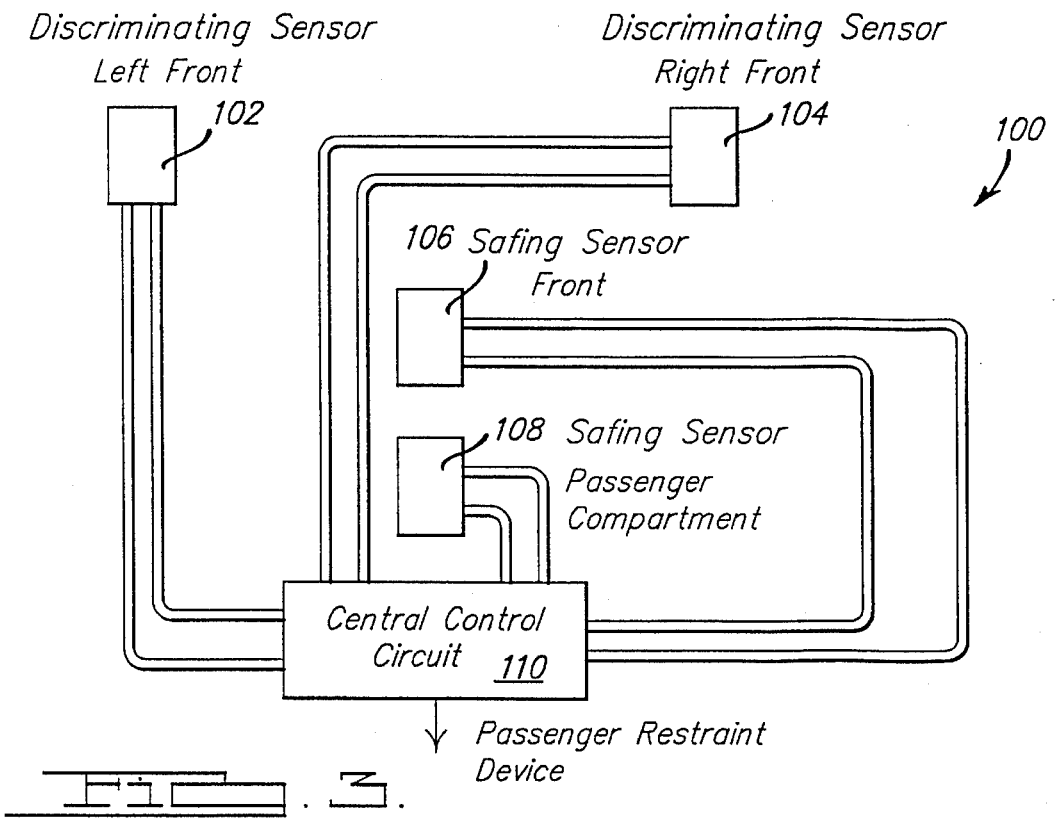
FIG. 3 is a diagrammatic schematic of a circuit comprising a plurality of the accelerometers of the instant invention connected in a "star" configuration.

FIG. 3 shows a vehicle crash discrimination system 100 utilizing a plurality of the above-described accelerometers 10. The basic system 100 comprises a left-front discriminating sensor 102, a right-front discriminating sensor 104, a first safing sensor 106 located in the front of the vehicle, and a second safing sensor 108 located in the passenger compartment of the vehicle. The safing sensors have lower triggering thresholds than the discriminating sensors as described hereinabove.

The system 100 is implemented by way of a "star" configuration of the sensors with a central control circuit 110. Each sensor path in the star configuration is provided with a discrete light source/detection circuit in central control circuit 100. Generally, the control circuit 110 would functionally AND together the outputs of safing sensors with the outputs of the discriminating sensors. With this arrangement, independent operation and monitoring of the sensors is provided. System integrity is also maintained, since the central control circuit 110 can identify the location of a faulty sensor/fiber and recalibrate the remaining sensors using each respective coil 64, as described hereinabove.

Figure 4:
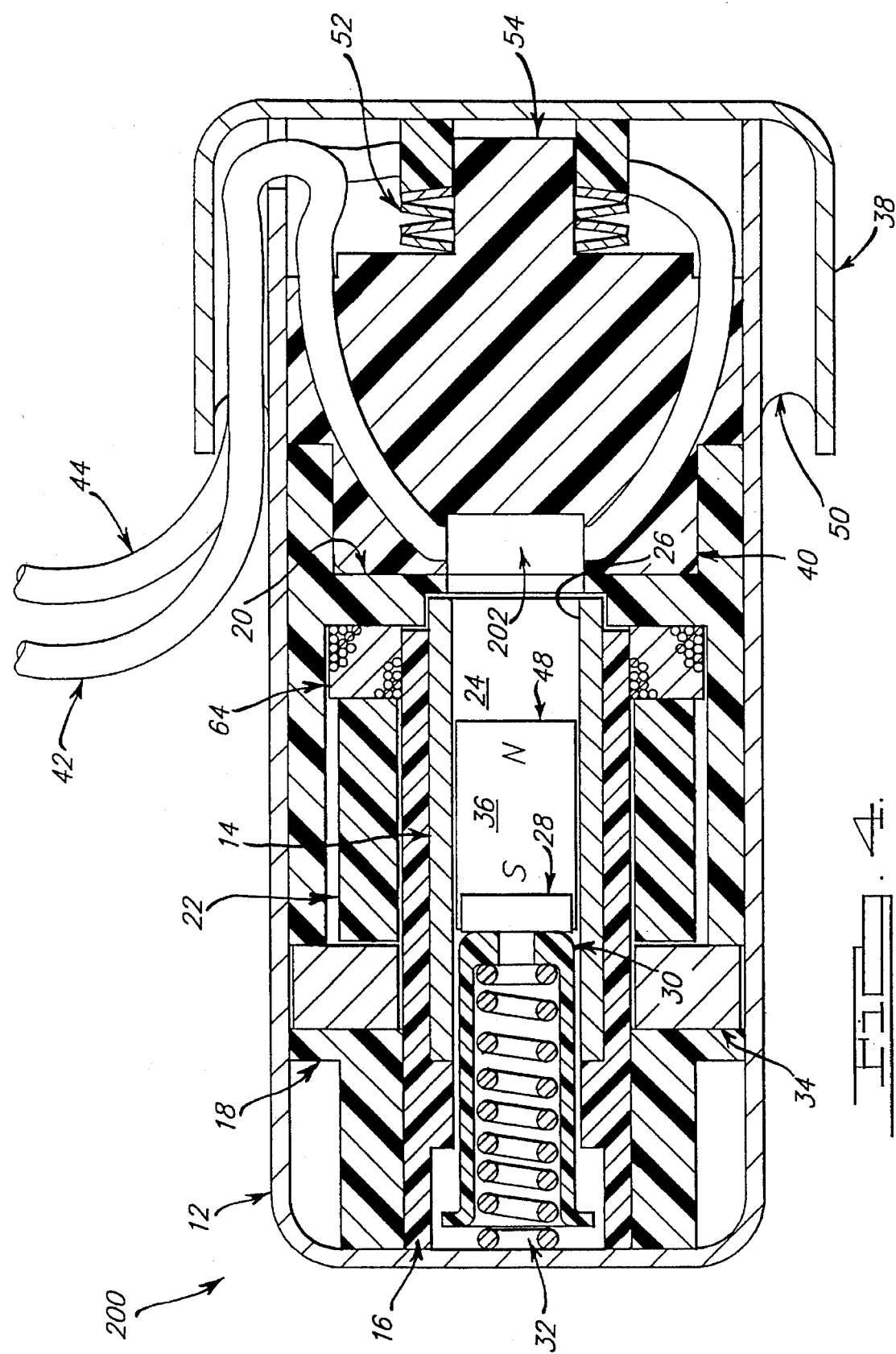
FIG. 4 is a longitudinal view in cross-section of a second exemplary embodiment of the instant accelerometer featuring a primarily binary optical output.

In the second embodiment 200 of the instant accelerometer shown in FIG. 4, wherein elements identical to those described above in connection with the first embodiment 10 have like reference numerals, the "analog" or variable-output fiber optic detection system has been replaced with an "on-off" binary optical switch system. Referring to FIG. 4, the ends of input fiber 42 and output fiber 44 are positioned in sightline respective with one another. Support element 40 has a cylindrical cut-out section 202 dimensioned and aligned to correspond with the second end of passage 24. In operation, a beam of light from a light source (not shown) is constantly fed from the input fiber 42, across cut-out section 202, to the output fiber 44. When the sensing mass 36 is displaced from the first position to the second position, the light becomes interrupted by the sensing mass 36 as it enters cut-out section 202. The interruption of the light beam is detected by remote circuitry (not shown), thereby indicating a vehicle crash event.

Figure 5:
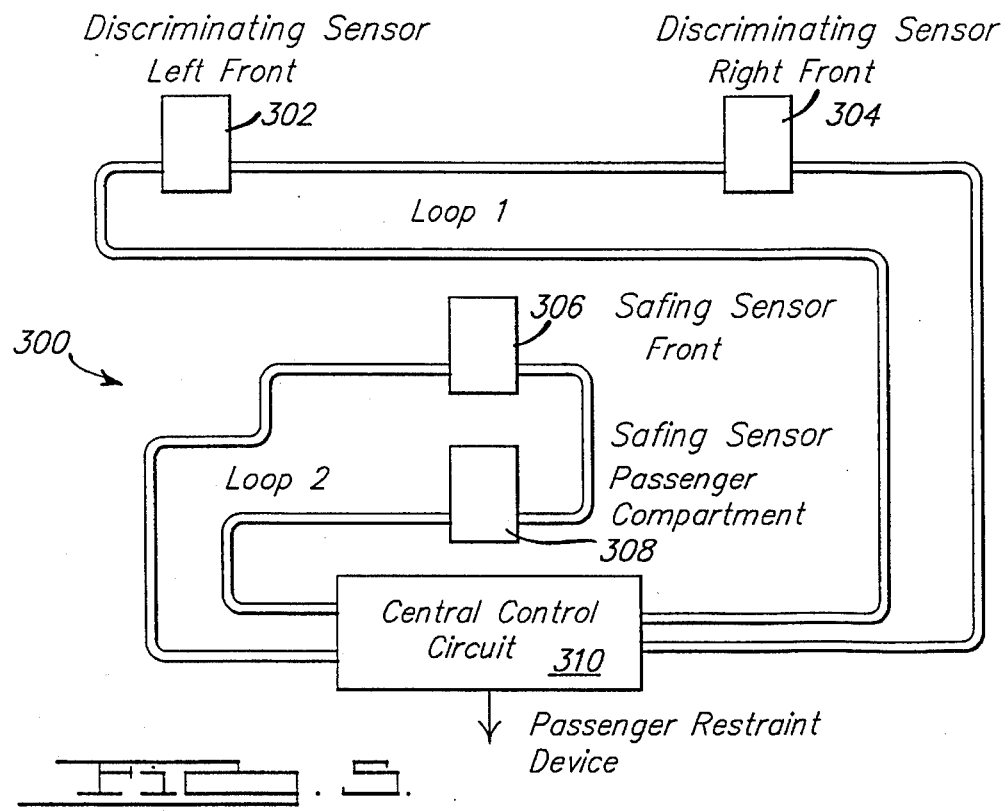
FIG. 5 is a diagrammatic schematic of a circuit comprising a plurality of the accelerometers of the instant invention connected in a "daisy chain."

A plurality of accelerometers 200 may be employed in a star configured discrimination system such as shown in FIG. 4. However, the accelerometer 200 is more advantageously utilized in a so-called "go/no-go" discrimination system, since a single light source and a single light sensor can be used for a plurality of accelerometers to simplify and reduce the cost of the system. FIG. 5 illustrates this so-called "daisy chain" configuration 300 for implementing the "go/no-go" system. A first loop ("loop A") connects a first high-threshold discriminating sensor 302 with a second high-threshold discriminating sensor 304, while a second, independent loop ("loop B") connects a first lower-threshold safing sensor 306 with a second lower-threshold safing sensor 308. The central control circuit would perform a logical ANDing of the signals transmitted through the first and second loops for use in detecting a vehicle crash event.

While the preferred embodiment of the invention has been disclosed, it should be appreciated that the invention is susceptible of modification without departing from the spirit of the invention or the scope of the subjoined claims.

I claim:

1. A vehicle crash discrimination system comprising:
 a central monitoring and control means;
 a first set of accelerometers connected to said central monitoring and control means in a first loop, said first set of accelerometers being responsive to a first vehicle acceleration threshold; and
 a second set of accelerometers connected to said central monitoring and control means in a second loop, said second set of accelerometers being responsive to a second vehicle acceleration threshold higher than said first threshold;
 wherein each of said plurality accelerometers includes:
  a housing having a passage extending therein;
  stop means defining a first end of the passage;
  a magnetically-permeable element secured to said housing proximate to the passage;
  a magnetic sensing mass in the passage, said sensing mass being magnetically biased towards said magnetically-permeable element so as to remain in a first position against the stop means until said magnetic bias is overcome by acceleration of said housing, whereupon said sensing mass is displaced in response to such acceleration from said first position towards a second position in the passage, said magnetic bias being sufficient to return said sensing mass to said first position from any other position in the passage, and
  an input optical fiber for emitting a beam of light generated by said central monitoring and control means;
 an output optical fiber positioned to receive said emitted light; and
 means for interposing said sensing mass between said input fiber and said output fiber, whereby the transmission of light from said input fiber to said output fiber is interrupted when said sensing mass is displaced towards said second position, wherein said output fiber of one of said plurality of accelerometers forms said input fiber of another of said plurality of accelerometers connected to the same loop, said central monitoring and control means triggering a passenger restraint device in response to any of said first set and any of said second set of accelerometers generating output signals indicative of respective sensing mass displacement to respective second positions.

2. A vehicle crash discrimination system comprising:

a central monitoring and control means;

a first set of accelerometers connected to said central monitoring and control means in a first loop, said first set of accelerometers being responsive to a first vehicle acceleration threshold; and a second set of accelerometers connected to said central monitoring and control means in a second loop, said second set of accelerometers being responsive to a second vehicle acceleration threshold higher than said first threshold;

wherein each of said plurality accelerometers comprises an inertial sensing mass which is displaced in response to vehicle acceleration from a first initial position towards a second position;

an input optical fiber for emitting a beam of light generated by said central monitoring and control means;

an output optical fiber positioned to receive said emitted light; and means for interposing said sensing mass between said input fiber and said output fiber, whereby the transmission of light from said input fiber to said output fiber is interrupted when said sensing mass is displaced towards said second position, wherein said output fiber of one of said plurality of accelerometers forms said input fiber of another of said plurality of accelerometers connected to the same loop, said central monitoring and control means triggering a passenger restraint device in response to any of said first set and any of said second set of accelerometers generating output signals indicative of respective sensing mass displacement to respective second positions.

* * * * *